(12) United States Patent
Kim et al.

(10) Patent No.: US 8,185,588 B2
(45) Date of Patent: May 22, 2012

(54) SYSTEM, APPARATUS, AND METHOD FOR MOBILE COMMUNITY SERVICE

(75) Inventors: Jae-Hwan Kim, Suwon-si (KR); Su-Hyung Ha, Suwon-si (KR); An-Na Kim, Suwon-si (KR); Young-Ho Rhee, Seoul (KR); Jung-Tae Lee, Suwon-si (KR)

(73) Assignees: Samsung Electronics Co., Ltd., Suwon-si (KR); Ajou University Industry-Academic Cooperation Foundation, Suwon-si (KR)

( * ) Notice: Subject to any disclaimer, the term of this patent is extended or adjusted under 35 U.S.C. 154(b) by 184 days.

(21) Appl. No.: 12/552,732

(22) Filed: Sep. 2, 2009

(65) Prior Publication Data

US 2010/0057850 A1    Mar. 4, 2010

(30) Foreign Application Priority Data

Sep. 2, 2008   (KR) .................. 10-2008-0086143

(51) Int. Cl.
*G06F 15/16* (2006.01)
*G06F 9/445* (2006.01)
*H04W 4/00* (2009.01)

(52) U.S. Cl. ......... 709/204; 455/466; 717/178; 709/217

(58) Field of Classification Search .................... 709/204
See application file for complete search history.

(56) References Cited

U.S. PATENT DOCUMENTS

| | | | |
|---|---|---|---|
| 6,433,795 | B1 | 8/2002 | MacNaughton et al. |
| 7,860,525 | B2 * | 12/2010 | Parkkinen et al. ............ 455/518 |
| 2003/0050986 | A1 * | 3/2003 | Matthews et al. ............ 709/206 |
| 2005/0102632 | A1 * | 5/2005 | Klinger et al. ................ 715/789 |
| 2005/0273702 | A1 * | 12/2005 | Trabucco ...................... 715/513 |
| 2007/0019616 | A1 * | 1/2007 | Rantapuska et al. .......... 370/352 |
| 2007/0223436 | A1 * | 9/2007 | Lenardi et al. ................ 370/338 |
| 2008/0261577 | A1 * | 10/2008 | Celik et al. .................... 455/416 |
| 2008/0268959 | A1 * | 10/2008 | Bryson et al. ................... 463/42 |
| 2009/0221307 | A1 * | 9/2009 | Wolak et al. .................. 455/466 |
| 2009/0300122 | A1 * | 12/2009 | Freer ............................. 709/206 |

FOREIGN PATENT DOCUMENTS

| WO | 02/39300 A1 | 5/2002 |
|---|---|---|
| WO | 2007/031708 A1 | 3/2007 |
| WO | 2008/066791 A2 | 6/2008 |
| WO | 2008/089479 A1 | 7/2008 |

* cited by examiner

*Primary Examiner* — Wing Chan
*Assistant Examiner* — David X Yi
(74) *Attorney, Agent, or Firm* — Jefferson IP Law, LLP

(57) ABSTRACT

A method and apparatus for a mobile community service are provided. In a method of operating a creator terminal for a mobile community service, the method includes creating a community for a community service by selecting at least one of a plurality of community types provided by a community server, downloading a task for the created at least one community service from the community server, and installing the downloaded task for the community service. Accordingly, a mobile community service can be provided to support various community activities occurring in everyday life on a real-time basis.

49 Claims, 11 Drawing Sheets

SYSTEM, APPARATUS, AND METHOD FOR MOBILE COMMUNITY SERVICE

PRIORITY

This application claims the benefit under 35 U.S.C. §119(a) of a Korean patent application filed in the Korean Intellectual Property Office on Sep. 2, 2008 and assigned Serial No. 10-2008-0086143, the entire disclosure of which is hereby incorporated by reference.

BACKGROUND OF THE INVENTION

1. Field of the Invention

The present invention relates to a mobile community service. More particularly, the present invention relates to a system, method, and apparatus for a mobile user-oriented mobile community service.

2. Description of the Related Art

The recent widespread use of the Internet has resulted in a rapid increase in the number of Internet users. Further, in addition to the conventional use of the Internet based on anonymity, a community may be organized for an alumni association, a religious group, a club, an interest group, etc., in a cyber space of the Internet so that members of the community communicate with each other and share information. For example, a specific member of the community can create a homepage of the community on the Internet and provide members with a bulletin board service, an address book service, or a chatting service and thus members of the community can communicate with each other.

FIG. 1 illustrates a conventional system for a web community service.

Referring to FIG. 1, the system for the web community service includes an Internet Protocol (IP) network 100, terminals (i.e., Personal Computers (PCs) and a laptop) 105, 110, and 115, and an online community web server 120.

The terminals 105, 110, and 115 can access a plurality of community sites through the IP network 100 to exchange information with a user having common interests. With the plurality of community sites being established, the online community web server 120 provides a community service to the PC 105, the laptop 110, the PC 115, etc.

The online community web server 120 is a server for configuring a web page on which information is exchanged among community members. The online community web server 120 provides a community member with a community's web page over the IP network 100. When a community member logs in, a member authorization process creates a web page including a list of information which is newly registered to the community and which is not read by the community member. The web page is transmitted to a client (e.g., the PC 105, the laptop 110, and the PC 115) of the community members.

In an everyday human life, a community activity is mainly achieved in a small-sized community on a real-time basis for a specific purpose based on relations such as families, friends, businesses, etc.

However, a conventional web-based online community provides a standardized service on a basis of a bulletin board for many subscribers, and is a community for information sharing. In addition, since web communities are independently managed for each community portal, registration information has to be input each time, or a login process is required. Further, it is difficult to monitor activities occurring in the community on a real-time basis. In many cases, the number of members who remain as observers or inactive members is greater than the number of users who actively participate in the community, and the members may interact with each other for only one interest rather than various interests.

That is, since the conventional web-based online community provides a standardized space for information sharing among a large number of subscribers according to a specific interest, there is a problem in that various types of community activities occurring in everyday human life or a customized service cannot be provided.

Accordingly, there is a need for a system, method, and apparatus for a mobile community service supporting various community activities occurring in everyday life on a real-time basis.

SUMMARY OF THE INVENTION

An aspect of the present invention is to address at least the above-mentioned problems and/or disadvantages and to provide at least the advantages described below. Accordingly, an aspect of the present invention is to provide a system, method, and apparatus for a mobile community service for a user of a mobile terminal.

Another aspect of the present invention is to provide a system, method, and apparatus for a mobile community service capable of actively supporting community activities occurring in everyday human life by using a mobile terminal.

Another aspect of the present invention is to provide a system, method, and apparatus in which a mobile terminal user can generate and operate any community on a real-time basis anytime anywhere and in which mobile community services are provided so that each community service is suitable for its community goal.

In accordance with an aspect of the present invention, a method of operating a creator terminal for a mobile community service is provided. The method includes creating a community for a community service by selecting at least one of a plurality of community types provided by a community server, downloading a task for the created at least one community service from the community server, and installing the downloaded task for the community service.

In accordance with another aspect of the present invention, a method of operating a server for a mobile community service is provided. The method includes determining a community member when a community creation is requested by a corresponding mobile terminal, transmitting a community invitation to the at least one community member determined by the mobile terminal, and providing a task for at least one community service when the community invitation is accepted.

In accordance with another aspect of the present invention, a method of operating an invitation terminal for a mobile community service is provided. The method includes receiving a community invitation from a community server, downloading a task for a community service from the community server when the community invitation is accepted, and installing the downloaded task for the community service.

In accordance with another aspect of the present invention, a creator terminal apparatus for a mobile community service is provided. The apparatus includes a community manager for creating a community for a community service by selecting at least one of a plurality of community types provided by a community server, a task manager for downloading a task for the created at least one community service from the community server, and a task executor for installing the downloaded task for the community service.

In accordance with another aspect of the present invention, a server apparatus for a mobile community service is provided. The apparatus includes a controller for determining at least one community member when a community creation is requested by a corresponding mobile terminal, for transmitting a community invitation to the at least one community member determined by the mobile terminal, and for providing a task for at least one community service when the community invitation is accepted.

In accordance with another aspect of the present invention, an invitation terminal apparatus for a mobile community service is provided. The apparatus includes a community manager for receiving a community invitation from a community server, a task manager for downloading a task for a community service from the community server when the community invitation is accepted, and a task executor for installing the downloaded task for the community service.

In accordance with another aspect of the present invention, a system for a mobile community service is provided. The system includes a creator terminal for creating a community for a community service by selecting at least one of a plurality of community types provided by a community server, for downloading a first task for the created at least one community service from the community server, and for installing the downloaded task, the community server for determining at least one community member when a community creation is requested by the creator terminal, for transmitting a community invitation to the at least one community member determined by the creator terminal, and for providing a second task for the at least one community service to an invitation terminal, and a plurality of invitation terminals for receiving the community invitation from the community server, and for downloading and installing, by one or more invitation accept terminals, the second task for the community service.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, the terms used herein are defined according to the functions of the present invention. Thus, the terms may vary depending on a user's or operator's intentions or practices. Therefore, the terms used herein must be understood based on the descriptions made herein.

Hereinafter, an exemplary system, method, and apparatus for a mobile community service supporting various community activities occurring in everyday life will be described.

A mobile community service platform is a service platform in which a "mobile community service" defined in exemplary embodiments of the present invention can be executed and operated on an existing Operating System (OS). The service platform is an environment where a user can download and use a specific type of service on a specific platform. For example, various web services can be used through a web browser. Herein, the web browser can be regarded as a service platform of a client that can show a web page.

Figure 1:
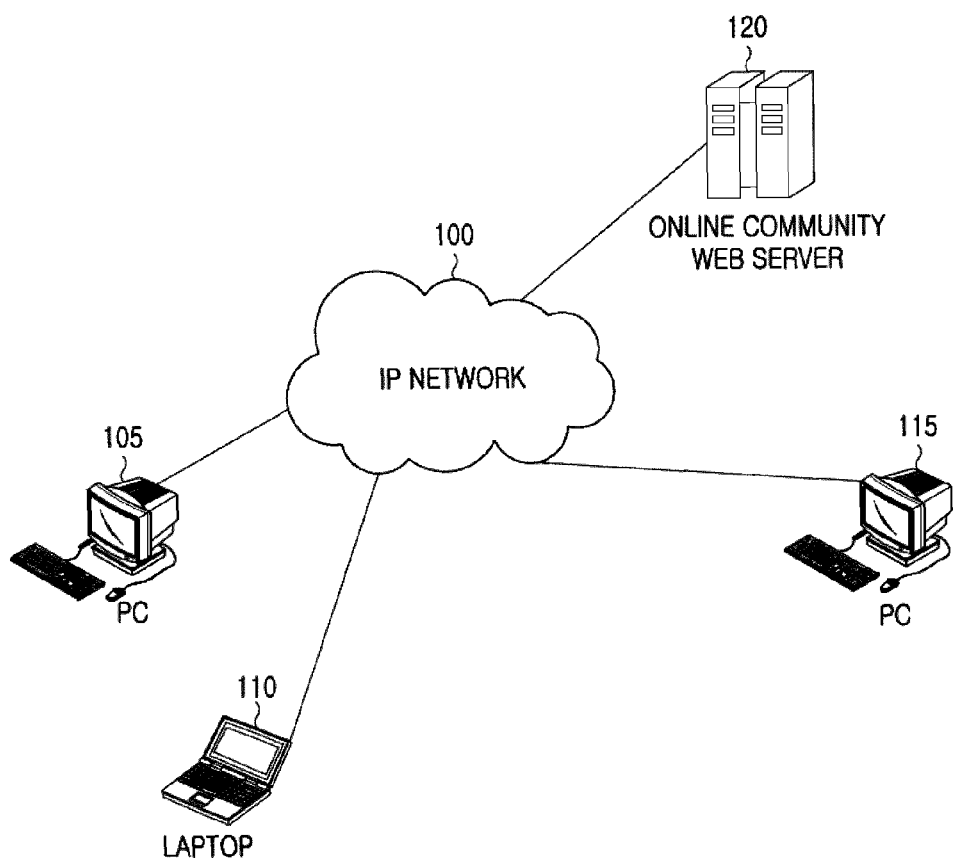
FIG. 1 illustrates a conventional system for a web community service.
Figure 2:
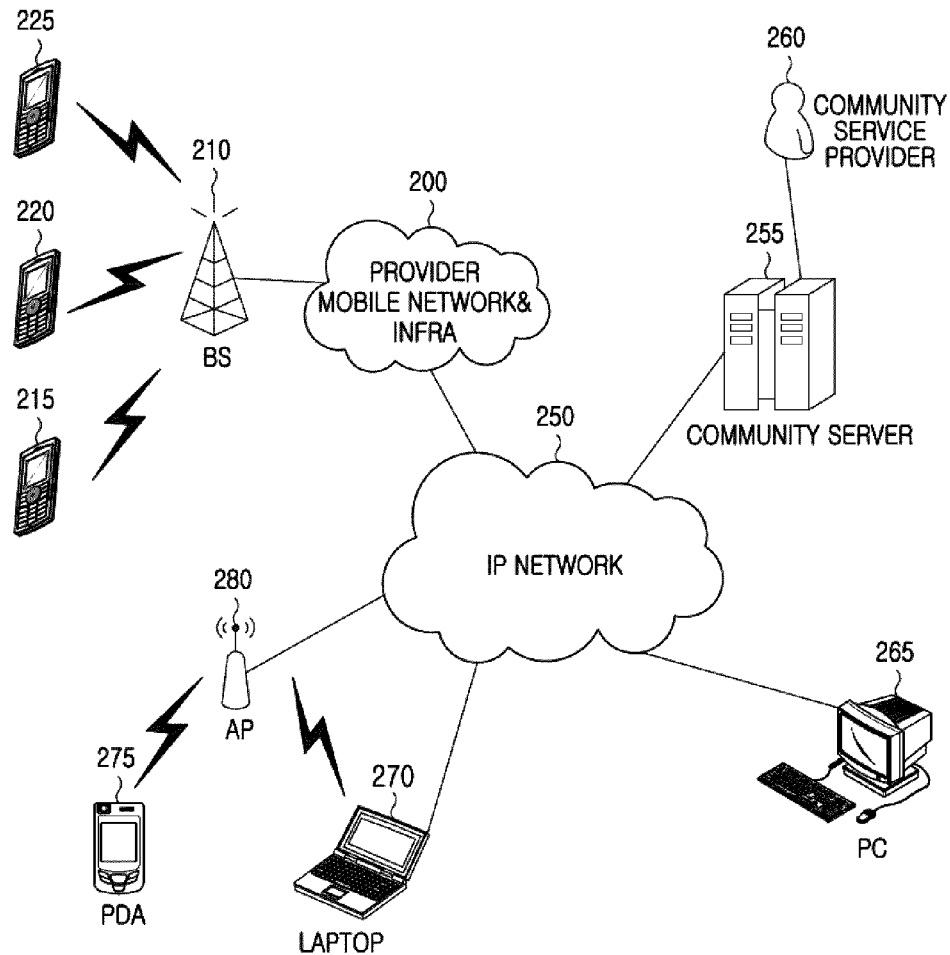
FIG. 2 illustrates a structure of a system for a mobile community service according to an exemplary embodiment of the present invention.

The mobile community service platform includes both a client environment and a server environment capable of operating the mobile community. The mobile community service platform has a system environment as shown in FIG. 2.

From a user's perspective, a mobile terminal can be regarded as a whole SoftWare (SW) environment where a "mobile community service" is searched for, selected, downloaded, and executed. The "mobile community service" provides a small-sized, real-time based, and real-relation based community similar to an actual community. A user can create a community for a service in a mobile environment. The created community is provided with a specialized service (e.g., providing information on presence, chatting, file sharing, personal broadcasting, schedule sharing, etc.) so that a community goal can be accomplished.

A mobile community model indicates all life cycles of a community such as a community creation, a community termination, a community activity, etc., in a mobile environment. In exemplary embodiments of the present invention, the mobile community is characterized in that a service provider provides various types of community services specialized for each community by using the mobile community service platform. This implies that the service provider analyzes a characteristic of each human community type in advance to provide a specialized service for a corresponding community service, and thus an optimum customized community service can be provided for each community type.

Unlike a conventional web-based online community in which a community is defined using a web service and a user uses a web browser, a community terminal of exemplary embodiments of the present invention immediately creates a community by downloading and executing a program for a community service.

That is, a user terminal is regarded as if it is one community member, and user terminals participate in community activities by communicating with each other. Therefore, unlike in the conventional online community, a service provided in exemplary embodiments of the present invention can have a configuration and type similarly to those of an actual human community which is characterized in instantaneous, on-the-spot, and participation of all members.

FIG. 2 illustrates a structure of a system for a mobile community service according to an exemplary embodiment of the present invention.

Referring to FIG. 2, the mobile community service system includes a plurality of community terminals 215, 220, and 225, a community server 255, a provider mobile network & infra 200, and an Internal Protocol (IP) network 250.

The community terminals 215, 220, and 225 are connected to the provider mobile network & infra 200 via a Base Station (BS) 210, and receives a mobile community service via the provider mobile network & infra 200. In this case, in order to ensure mobility, the community terminals 215, 220, and 225 use the BS 210 when accessing the provider mobile network & infra 200. In addition thereto, the community terminals 215, 220, and 225 may download a task for each of various community types provided by a community service provider 260 via the community server 255 to create a community between mobile terminals on a real-time basis, and may use various services specialized for a corresponding community according to a community task. Details of devices for the community terminals 215, 220, and 225 will be described below with reference to FIG. 3.

In addition to the mobile terminal, the system of an exemplary embodiment of the present invention may include a Personal Digital Assistant (PDA) 275, a laptop 270, an Access Point (AP) 280, or a Personal Computer (PC) 265 and can receive a web-based community service via the IP network 250 as in the conventional method.

The community service provider 260 uses a Software Development Kit (SDK) to develop a mobile community service of various types such as family, friend, meeting, etc., and then registers the mobile community service to the community server 255 or the like.

The community server 255 stores and manages various community types and service packages provided by the community service provider 260, and if necessary, provides corresponding community type information to the community terminals 215, 220, and 225.

The community server 255 manages community member information and also manages various communities created by a mobile user. Further, the community server 255 supports controls among community members, and manages a community type.

The community type may be a group of people (e.g., family, friend, and meeting). A community is a service package created by the community service provider 260 according to the community type. The community terminals 215, 220, and 225 can create their communities by selecting a desired community type.

For example, when the community terminals 215, 220, and 225 intend to create a community for meeting, they can create a community called a "project meeting" by selecting a "meeting community type" provided by the service provider.

The mobile community service has the following characteristics. First, when creating a community, the user terminals 215, 220, and 225 simultaneously specify a member community creation and a community request by using an address book preserved in the user terminals or an address book pre-registered in the community server 255.

When implementing the community, specified members receive a community invitation from the community server 255. If the invitation message is accepted, the members join the community at the same time of downloading a community service program, and can use a community service immediately thereafter.

Once the community is created, registration or deregistration of members can be achieved using a menu provided by the mobile terminals. After a community goal is accomplished, a master member who first creates the community immediately terminates the community. Thus, a dynamic community service which is valid only for a specific time such as in a meeting community can be provided.

A community is managed in such a manner that a downloaded community service program that provides a service specialized for the community is pre-defined by a service provider and thus a user can use a community service by selecting a menu. This implies that the same type of community can create a customized community service satisfying various ranks or requirements.

Figure 3:
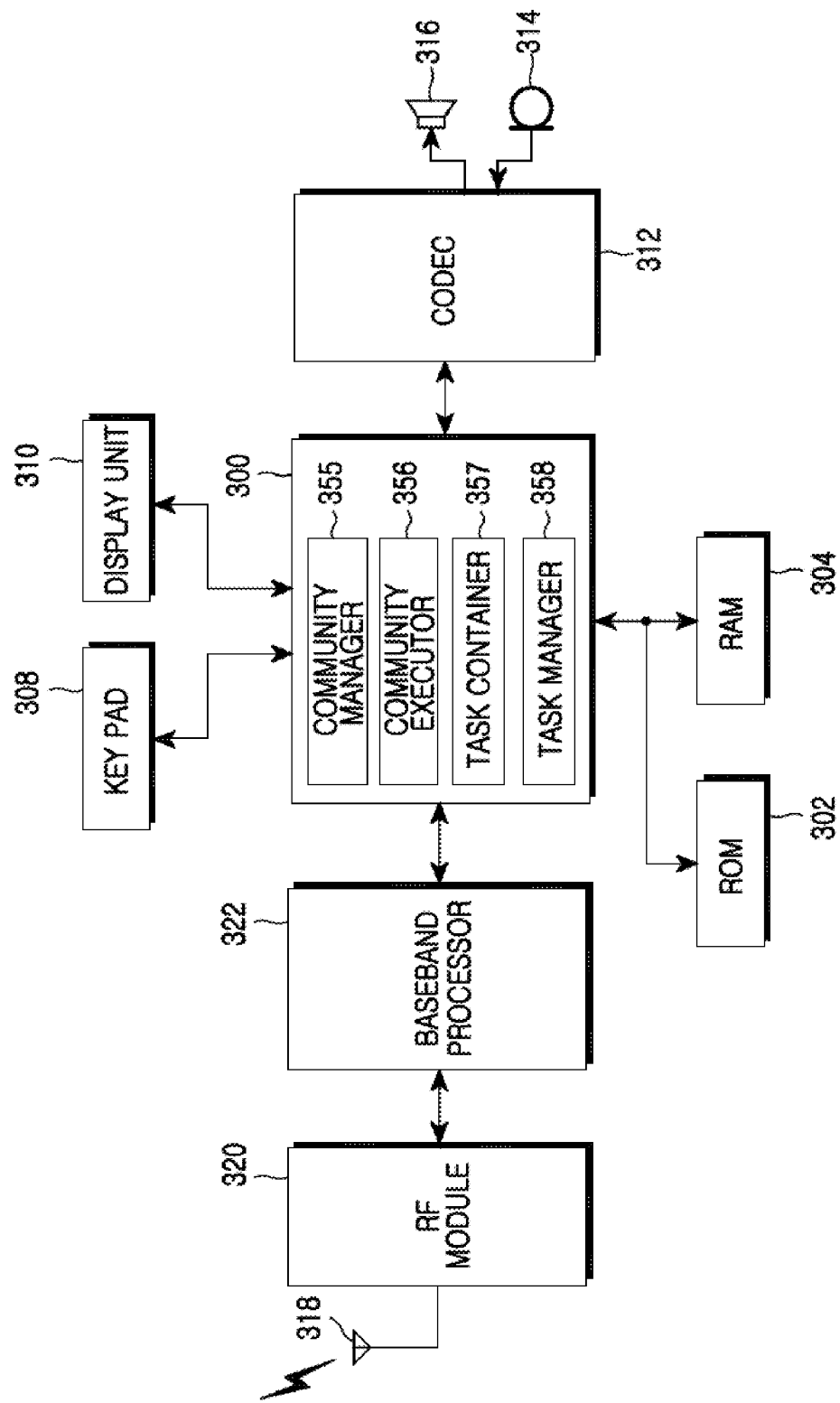
FIG. 3 is a block diagram illustrating a mobile terminal for executing a mobile community service according to an exemplary embodiment of the present invention.

FIG. 3 is a block diagram illustrating a mobile terminal for executing a mobile community service according to an exemplary embodiment of the present invention. An Operating System (OS) used by the mobile terminal may be a platform OS such as Linux, Window Mobile, and Symbian.

Referring to FIG. 3, a controller 300 provides overall controls to the mobile terminal. For example, the controller 300 processes and controls a voice call and a data communication. In addition to the conventional functions, the controller 300 controls overall services of a mobile community, and for this, the controller 300 includes a community manager 355, a community executor 356, a task container 357, and a task manager 358. In the following description, the conventional functions (i.e., processing and control) of the controller 300 will be omitted.

The controller 300 controls a baseband processor 322 and a Radio Frequency (RF) module 320 to manage a connection channel directly connectable to a community server or members, or to control a protocol.

The community manager 355 manages whole information required for an operation of a currently established community. The community manager 355 updates and maintains a community state on a real-time basis by communicating with the community server.

The task manager 358 manages an operation for downloading and installing a development task of an actual community. A task for performing a corresponding community is created according to a role determined by a master terminal.

A model for the role is another feature of an exemplary embodiment of the present invention. Similarly to a human society having a structural hierarchy, the role can be assigned when a community is created in such a manner that the role differs depending on the hierarchy. A service, function, right, etc., capable of using the community can be defined according to the role. This can be implemented when a service provider defines different community services according to the role, and when a community service is realized, a member defines the role by downloading and executing a community service suitable for the role of the member. In the following description, this is referred to as role member binding. That is, in this method, when one community is configured, a service right or a usage range is determined such that members download different programs suitable for each role instead of downloading the same program. That is, a horizontal human relation model of the conventional online community can be realized as a vertical human relation model according to a community service platform of an exemplary embodiment of the present invention, and thus a community service similar to human life can be provided.

The task is a new terminology defined in an exemplary embodiment of the present invention. All members have tasks suitable for their roles. A process of accomplishing a community goal through cooperation among members based on the tasks assigned to the members is defined as a community in an exemplary embodiment of the present invention. Similarly to the definition of the model based on the role, the task is defined as a community service program in association with one role in one community type.

That is, downloading of a community service program suitable for a role of a member implies that the role of the member is included in the program. A process of completing a task of a user is equivalent to an act of a user who uses a community service downloaded by the user.

The task container 357 manages a life cycle of tasks installed by the task manager 358, and loads a corresponding community task to control execution and termination of the task.

The community executor 356 initializes and terminates a whole community service platform, manages an overall platform environment, and provides an execution environment of the tasks.

Further, the community executor 356 provides a User Interface (UT) to show information on a list of currently operating communities, to create a new community, or to terminate an existing community.

The community manager 355, the community executor 356, the task container 357, the task manager 358, etc., can be implemented independently from the controller 300, or only some of them may be processed by the controller 300.

A Read Only Memory (ROM) 302 stores a microcode of a program, by which the controller 300 is processed and controlled, and a variety of reference data. Further, the ROM 302 stores a variety of rewritable data to be preserved, such as phonebook entries, outgoing messages, and incoming messages. In addition to the conventional functions, the ROM 302 stores a program for operating a community provided from the community server, and stores a task supporting a service provided by the community.

A Random Access Memory (RAM) 304 is a working memory of the controller 300 and stores temporary data that is generated while programs are performed.

The key pad 308 includes a plurality of function keys such as numeral key buttons of '0' to '9', a menu button, a cancel (or delete) button, an OK button, a talk button, an end button, an Internet access button, a navigation (or direction) key button, and a character input key. Key input data, which is input when the user presses these keys, is provided to the controller 300.

The display unit 310 displays information such as state information, which is generated while the mobile terminal operates, limited numeral characters, large-sized moving and still pictures, etc. The display unit 310 may be a color Liquid Crystal Display (LCD).

A COder-DECoder (CODEC) 312, which is connected to the controller 300, and a speaker 316 and a microphone 314, each of which connected to the CODEC 312, are voice input/output blocks used for phone call and voice recording.

The CODEC 312 converts Pulse Code Modulation (PCM) data provided from the controller 300 into an analog voice signal, and outputs the analog voice signal through the speaker 316. Further, the CODEC 312 converts a voice signal received through the microphone 314 into PCM data, and provides the PCM data to the controller 300.

The RF module 320 down-converts an RF signal received through an antenna 318 into a lower frequency signal, and provides the lower frequency signal to the baseband processor 322. Further, the RF module 320 up-converts a baseband signal provided from the baseband processor 322 into a higher frequency signal, and transmits the higher frequency signal through the antenna 318.

The baseband processor 322 processes a baseband signal transmitted and received between the RF module 320 and the controller 300. For example, when data is transmitted, the baseband processor 322 performs channel coding and spreading on the data to be transmitted, and when data is received, the baseband processor 322 performs dispreading and channel decoding on the received data.

Figure 4:
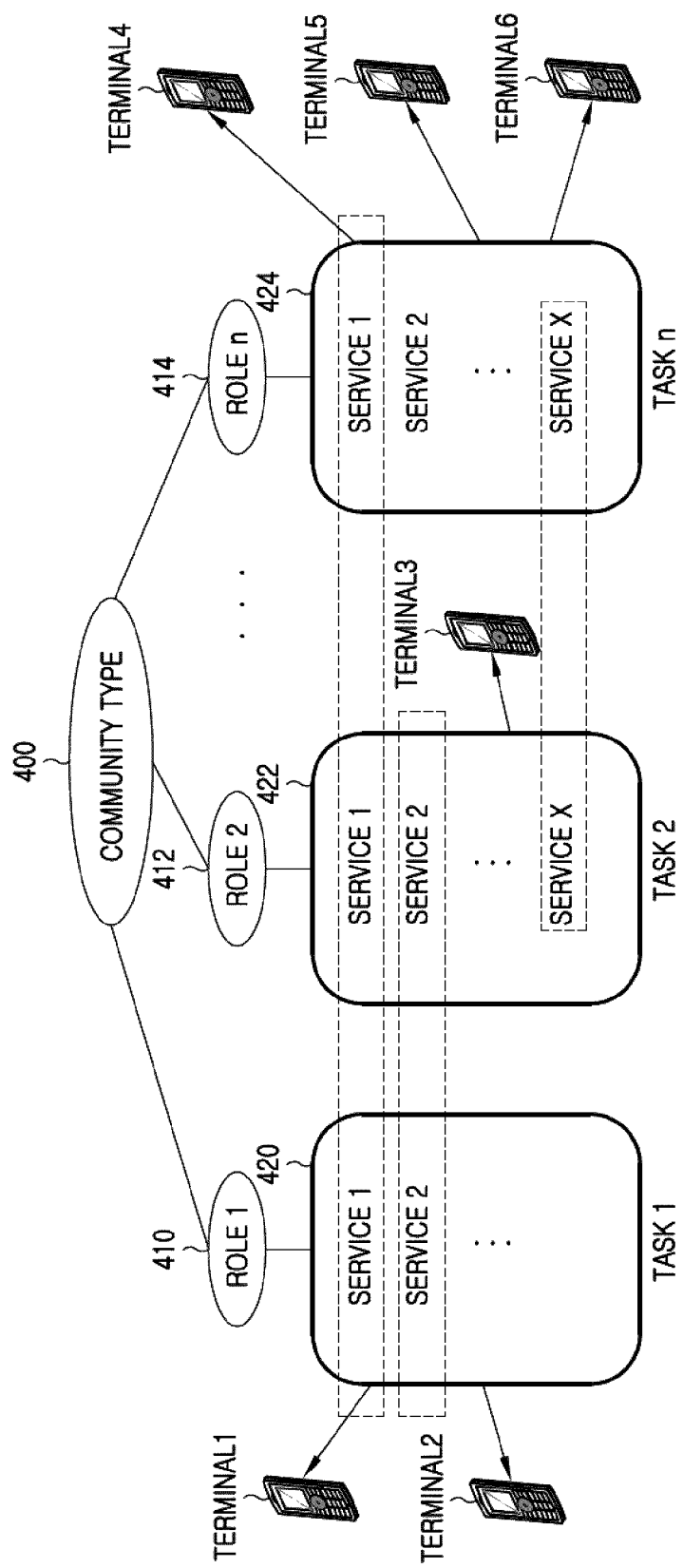
FIG. 4 illustrates an example of a mobile community model according to an exemplary embodiment of the present invention.

FIG. 4 illustrates an example of a mobile community model according to an exemplary embodiment of the present invention.

Referring to FIG. 4, a community type is defined by one or more roles and a set of services for executing the roles. This concept is similar to a sort of right and a service usage range depending on the right in a web community.

Referring to FIG. 4, a new community configuration and creation model is provided. One or more roles 410, 412, and 414 can be defined for a community type 400. A master terminal defines a corresponding role among n roles of community members, and the master terminal or the community members download and uses tasks 420, 422, and 424 suitable.

Each task includes various services that can cooperate with community members according to a role. If a service is included in all roles for example in a case of service 1, all members can use the service. If a service is included in a specific role for example in a case of service 2 or service X, communication can be achieved between tasks (i.e., between terminal 3 and terminal 4 (or terminal 5 or terminal 6)) with a role including the service.

As described above, a terminal has a role when registered in a community, and downloads a task of the role to use a community service. This operation will be referred to as role member binding.

For example, in a case of a personal broadcast community, the role may be a 'broadcast providing role' and a 'broadcast watching role'. A task of the broadcast providing role may be a broadcast providing service. A task of the broadcast watching role may be a broadcast watching service. A common service may be chatting between a broadcast provider and a broadcast watcher or may be a messaging service.

Although terminals 1 to 6 are in a community, these terminals may use different services according to a role of a task in use. The task is a set of services corresponding to the role, and is a sort of S/W packets (programs) downloaded by a terminal when a community is created.

As such, a role and a task to be performed in a community may be pre-defined by a service provider so that a user can configure a community suitable for a role of the user and so that the user can use a service. In addition, the service provider can configure a service and a role of a member of a specialized community for each community type.

Figure 5:
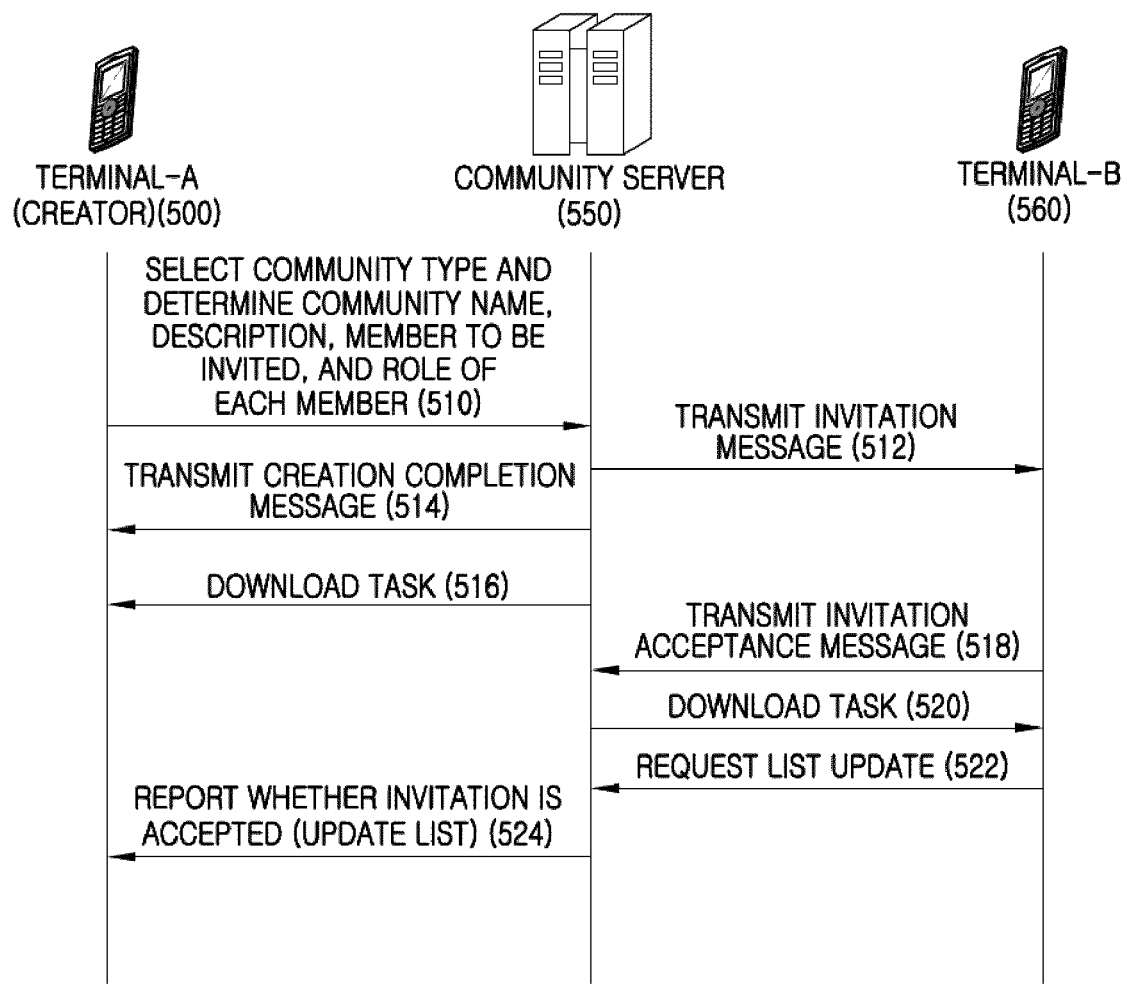
FIG. 5 illustrates a signal flow when a mobile community is created according to an exemplary embodiment of the present invention.

FIG. 5 illustrates a signal flow when a mobile community is created according to an exemplary embodiment of the present invention.

Referring to FIG. 5, terminal-A 500 intending to create a community accesses a community server 550 according to a predefined process, selects a community type, determines a community name, a description, a plurality of members to be invited, and a role of each member, and reports the selection and determination results to the community server 550 in step 510.

Upon receiving a request for creating a community from the terminal-A 500 together with information required to create the community, the community server 550 checks information on a plurality of members to be invited, and transmits a community invitation to to-be-invited terminal-B 560 in step 512. Further, the community server 550 transmits to terminal-A 500 a creation completion message in response to the community creation request in step 514.

Upon receiving the creation completion message, terminal-A 500 downloads a task suitable for a corresponding role from the community server 550 in step 516.

Upon receiving the community invitation, terminal-B 560 can accept or not accept community registration. If the community invitation is accepted in step 518, a task suitable for a role assigned for terminal-B 560 can be downloaded from the community server 550 in step 520.

Terminal-B 560 determines its state and community environment setup values, and requests list update in step 522.

Terminal-A 500 determines whether terminal-B 560 accepts the invitation, and updates a list by referring the state of terminal-B 560 and the community environment setup values in step 524.

Thereafter, the procedure of FIG. 5 ends.

The same procedure is also applied when a community is configured by simultaneously specifying several members. In addition, terminal-A 500 can additionally register a new member after a community creation is complete, and in this case, a community invitation is also transmitted in the same manner to a counterpart terminal to perform a registration process.

Figure 6:
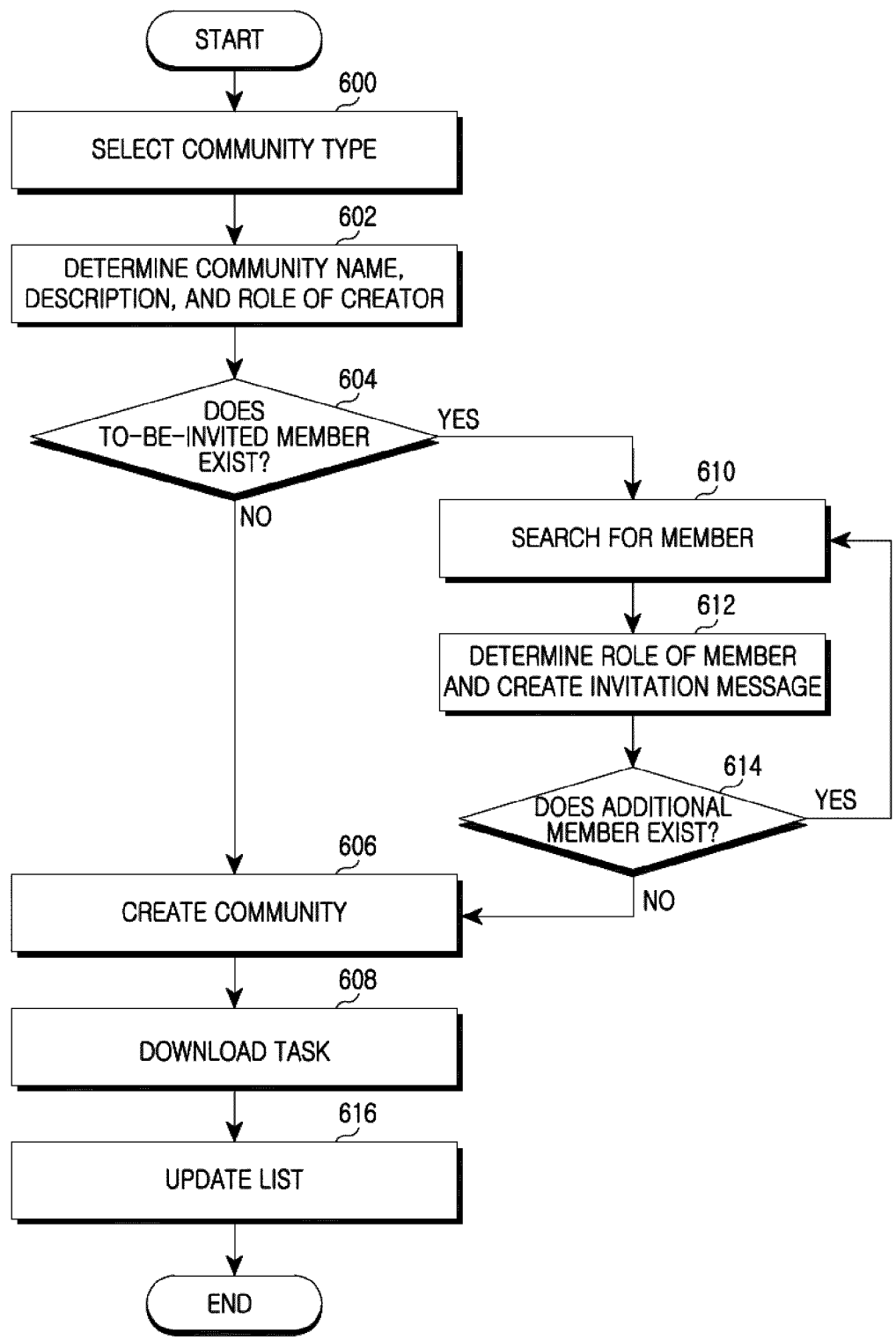
FIG. 6 is a flowchart illustrating an operation of a creator terminal for creating a mobile community according to an exemplary embodiment of the present invention.

FIG. 6 is a flowchart illustrating an operation of a creator terminal for creating a mobile community according to an exemplary embodiment of the present invention.

Figure 9:
FIG. 9 illustrates a community main screen according to an exemplary embodiment of the present invention.

Referring to FIG. 6, in step 600, the terminal accesses the community server 550 of FIG. 5 according to a predefined process, and then selects a community type. For example, when the terminal accesses the community server according to the predefined process in order to create a new mobile community, the mobile terminal displays a community main screen as shown in FIG. 9. Various community types (e.g., meeting, family birthday party, school, music, club, etc.) are displayed on the community main screen. The terminal may select a desired community type by using a community creation menu.

Figure 10:
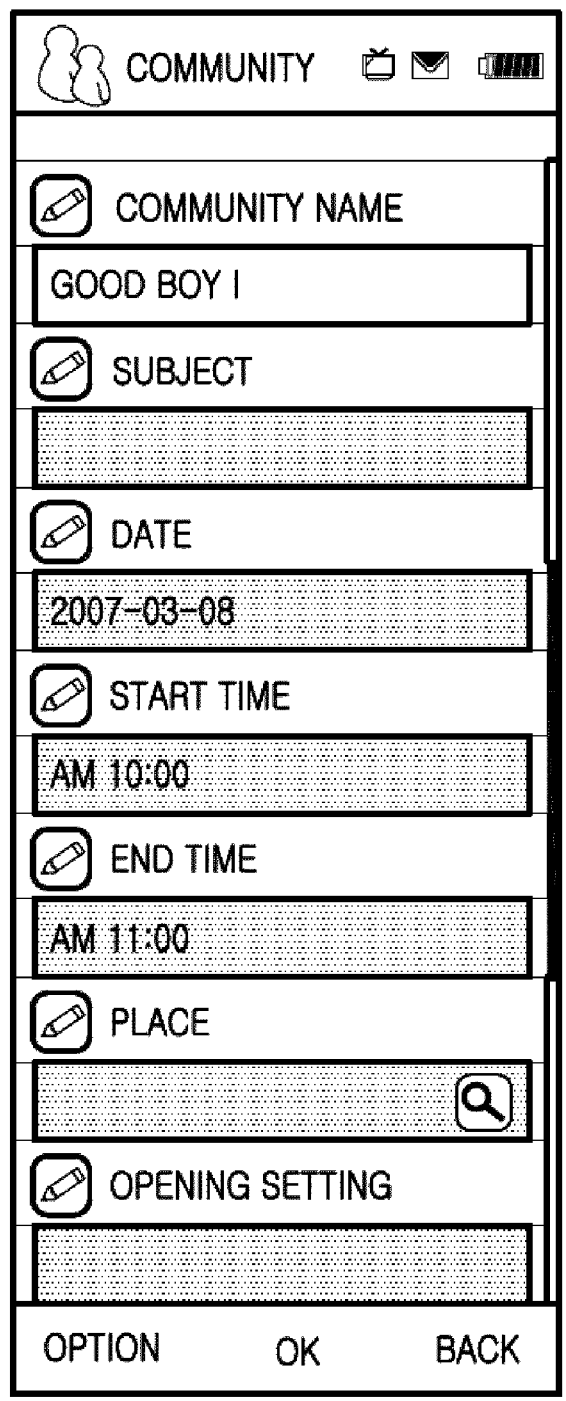
FIG. 10 illustrates a screen for inputting community creation information according to an exemplary embodiment of the present invention.

In step 602, the terminal determines a community name, a description, and a role of a creator, and then reports the determination result to the community server. For example, the terminal selects a community, and then inputs basic information required to create the community as shown in FIG. 10. In this case, an input field may differ for each community type, and is defined by a service provider.

If there is no member to be invited in step 604, proceeding to step 606, the terminal creates a corresponding community. In contrast, if there is a member to be invited in step 604, proceeding to step 610, the terminal searches for the member. In step 612, a member role is determined and an invitation message is created. If there is an additional member in step 614, returning to step 610, the member is searched for again. If there is no additional member, proceeding to step 606, the community is created.

That is, during an input process, the terminal may specify members to be invited to the community by searching for them from a phone book or member information of a server. Further, the terminal determines a member role for the specified member and creates an invitation message.

In step 608, the terminal downloads tasks according to its role defined for a corresponding community type from the community server. The task is a basic unit for execution of a corresponding community managed by the terminal.

In step 616, the terminal updates a list by referring received values (i.e., a state of invited members and community environment setup values).

Thereafter, the procedure of FIG. 6 ends.

Figure 7:
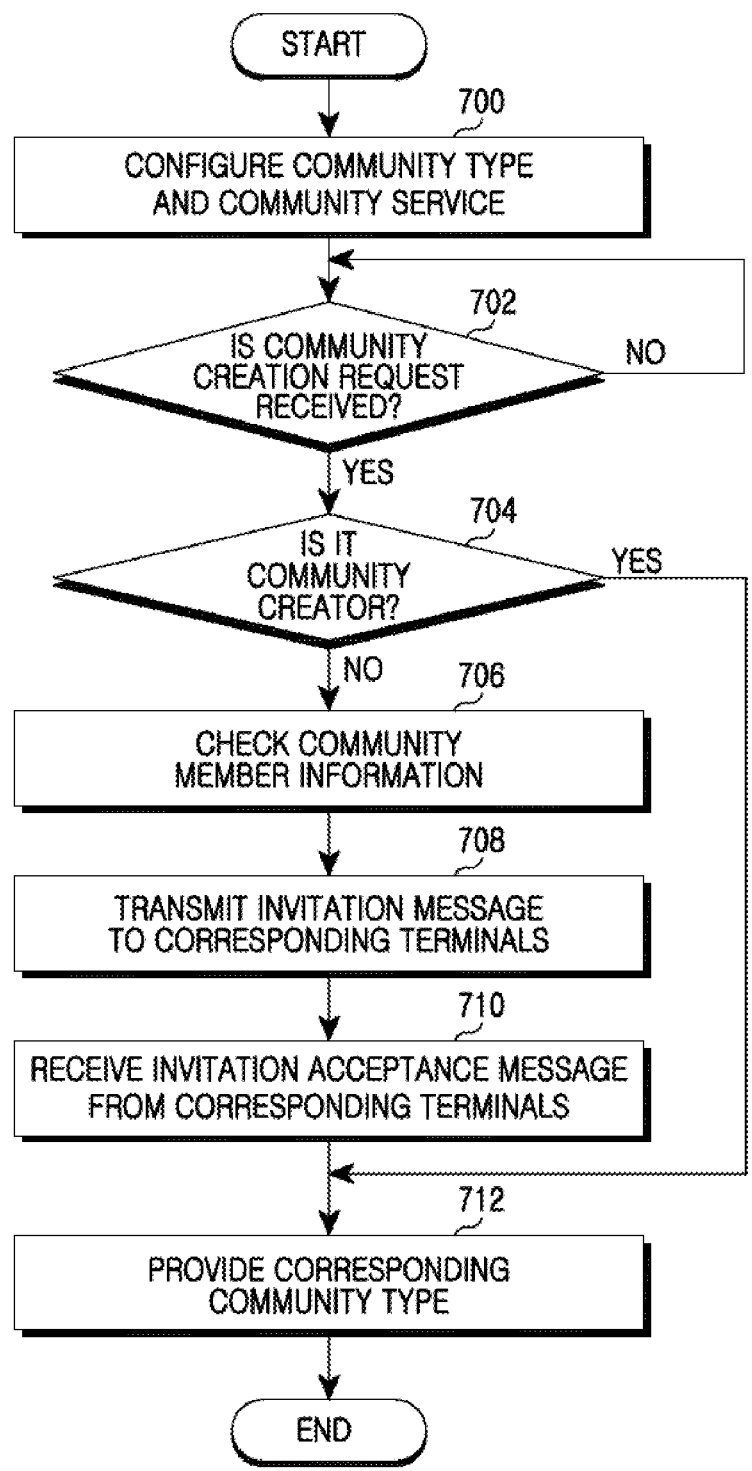
FIG. 7 is a flowchart illustrating an operation of a community server for creating a mobile community according to an exemplary embodiment of the present invention.

FIG. 7 is a flowchart illustrating an operation of a community server for creating a mobile community according to an exemplary embodiment of the present invention.

Referring to FIG. 7, in step 700, the community server stores various community types provided from a community service provider, and configures a community service.

If the community server receives a request for creating a community from a corresponding terminal together with information required to create the community in step 702, proceeding to step 704, the community server determines whether the terminal is a community creator. If it is determined that the terminal is the community creator, proceeding to step 712, the community server provides the community creator terminal with a corresponding community type. The information required to create the community includes a list of members to be invited to the community.

In contrast, if it is determined that the terminal is not the community creator (i.e., if the terminal is a terminal invited to the community) in step 704, the community server checks community member information in step 706, and transmits a community invitation to each community member in a one-to-one manner or a multicast manner in step 708.

In step 710, the community server receives from the invited members a message for reporting whether the community invitation is accepted. In step 712, the community server provides the invited community members with a corresponding community type.

Thereafter, the procedure of FIG. 7 ends.

Figure 8:
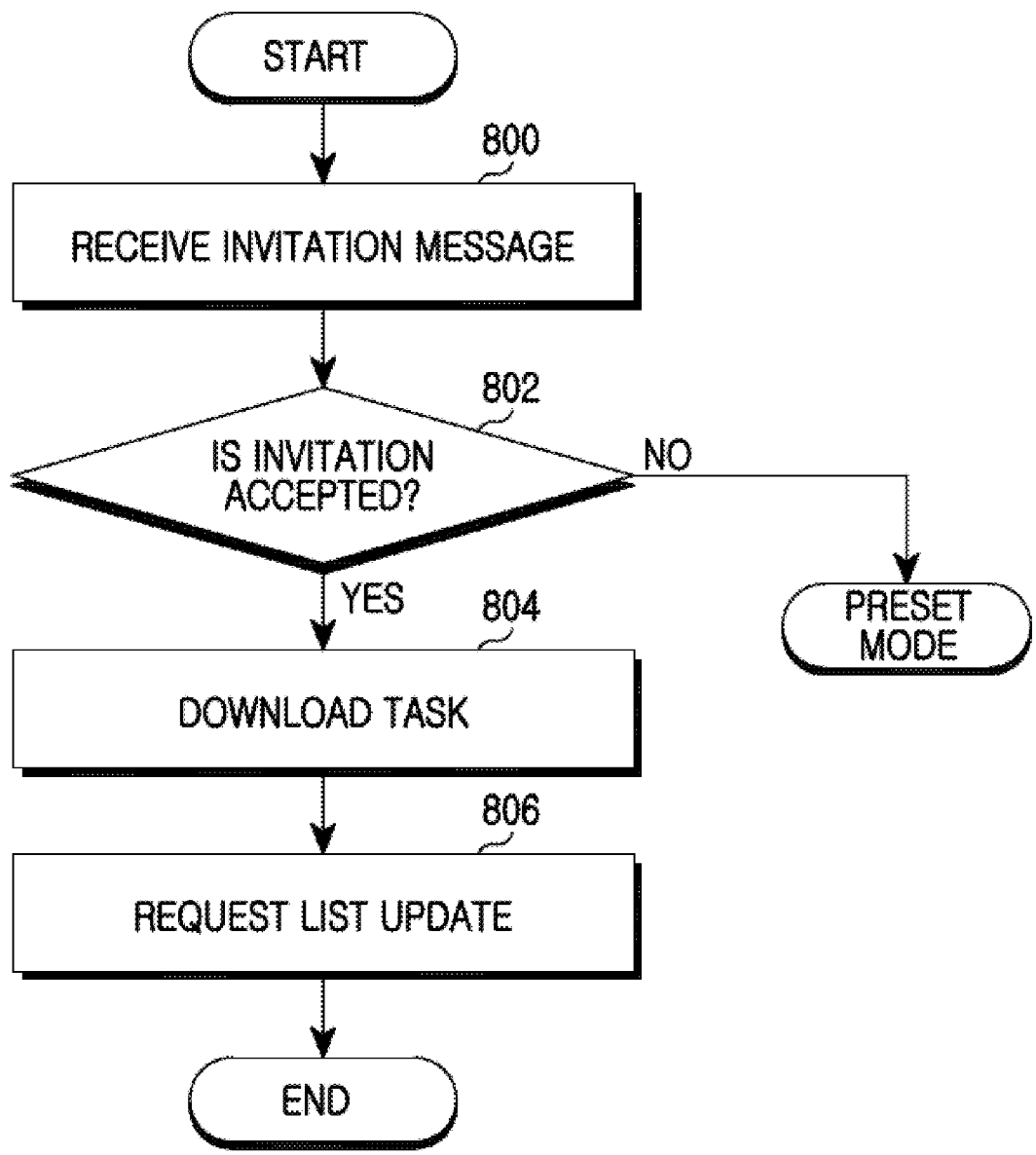
FIG. 8 is a flowchart illustrating an operation of an invitation terminal for joining a mobile community according to an exemplary embodiment of the present invention.

FIG. 8 is a flowchart illustrating an operation of an invitation terminal for creating a mobile community according to an exemplary embodiment of the present invention.

Referring to FIG. 8, the invitation terminal receives a community invitation from a community server in step 800, and determines whether to accept the invitation to the community in step 802. If the invitation to the community is accepted, proceeding to step 804, the invitation terminal downloads tasks of a corresponding community type according to a role defined by a creator terminal. In contrast, if it is determined that the invitation to the community is not accepted, the invitation terminal operates in a preset mode. In the preset mode, the community invitation may be received again, thus returning to step 800, or a community creation process may be terminated by transmitting an invitation denial message.

In step 806, the invitation terminal transmits its state and community environment setup values and thus requests a community server to update a list.

Thereafter, the procedure of FIG. 8 ends.

As described above, the community server stores various community types provided by the service provider, and community members are registered when a community is initially created.

FIG. 9 illustrates a community main screen according to an exemplary embodiment of the present invention. An option menu is displayed on the community main screen so that a user can create a new community or delete an existing community.

Referring to FIG. 9, a first creator of a community has a master role and a right to terminate the community when a community service ends afterwards. A master right can be endorsed to another community member.

To create a new mobile community, a mobile terminal selects a desired community type by using a community creation menu from a community main screen of FIG. 9, and inputs basic information necessary for community creation as shown in FIG. 10. In this case, an input field may differ according to each community type, and is defined by a service provider.

During an input process, a user can search for member information of a server or a phone book to find and specify a member to be registered to the community. When the member is registered in the process of community creation, the community server transmits a community invitation to each registered member, and if the invitation is accepted by the member who receives the community invitation, a registration process is performed on a corresponding community.

Figure 11:
FIG. 11 illustrates a member presence screen of a meeting community according to an exemplary embodiment of the present invention.

When the user selects a community from the community main screen of FIG. 9, a screen appears as shown in FIG. 11. The community screen of FIG. 11 shows a list of current members registered to the community.

The list of the current members is shown by using an own presence protocol or a presence technique of a well-known IP Multimedia Subsystem (IMS).

Referring to FIG. 11, a first item in each row shows a photo of a member and is received from a server or a phonebook of a terminal. A second item in each row shows member's emotion or on/off states, and is displayed with an icon. If the member is in an offline state, "Offline" is displayed. A third item in each row shows a name of the member. When the member is selected from a list, a message set by the member is displayed. A fourth item in each row shows an activity of the member, and indicates a usage state of a specific service such as "file sharing", "music listening", "personal broadcasting", etc.

When the user presses an option menu from the screen of FIG. 11, a service menu of a corresponding task is displayed so that the user can select a service menu to use a corresponding service.

As an exemplary embodiment of the present invention, a "meeting community" will be described for example.

The meeting community includes several basic services for meeting. A function necessary for the meeting community is pre-defined by a service provider. A form and type of service can be variously configured by the service provider.

Examples of a service provided in the meeting community include a "presence service", a "schedule sharing service for meeting scheduling", a "meeting document sharing service", a "video broadcast service", a "chatting service", etc.

The presence service consists of a member's photo as shown in FIG. 11, a current state, a text IDentifier (ID), and an activity status.

When a meeting host allows a meeting document to be shared by using a terminal of the meeting host in the meeting community, a community server can update presence information of a community creator, and report updated information to terminals of different members. The different members can confirm that presence information of the community creator is updated, and download or view a shared file by using a menu.

A schedule sharing service is a service in which a meeting community service finds an available meeting time of a corresponding date by referring scheduling information of each member to recommend a meeting time. Otherwise, the available meeting time is scheduled by contacting each of meeting attendants (or members).

The video broadcast service is a service for sharing an on-the-spot situation provided on a real-time basis from a member, who is in a temporary duty on the spot, with all members in a broadcast-based meeting room during the meeting is held.

Figure 12:
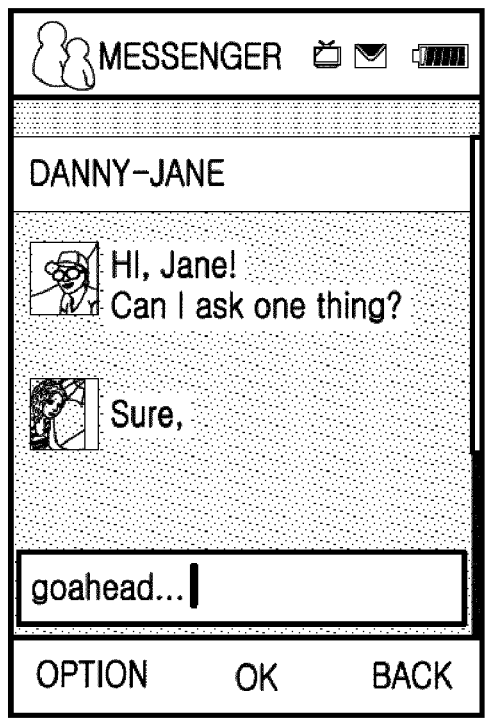
FIG. 12 illustrates a chatting service screen of a meeting community according to an exemplary embodiment of the present invention.

The chatting service is a service for supporting simple text chatting among members (see FIG. 12).

As in the exemplary embodiment of the meeting community, a community consists of a community member and a community service, and the community service can be variously provided for each community type.

According to exemplary embodiments of the present invention, a mobile community service can be provided to support various community activities occurring in everyday life on a real-time basis. In addition, a new type of differentiated community service can be provided for a new mobile life style in a most suitable way.

Exemplary embodiments of the present invention can also comprise computer readable codes on a computer readable medium. The computer readable medium can comprise any data storage device that can store data that can be read by a computer system. Examples of a computer readable medium include magnetic storage media (such as, ROM, floppy disks, hard disks, among others), optical recording media (such as, CD-ROMs, or DVDs), and storage mechanisms such as carrier waves (such as, transmission through the Internet). The computer readable medium can also be distributed over network coupled computer systems so that the computer readable code is stored and executed in a distributed fashion. Also, functional programs, codes, and code segments for accomplishing exemplary embodiments of the present invention can be construed by programmers of ordinary skill in the art to which the present invention pertains.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method of operating a creator mobile terminal for a mobile community service, the method comprising:
   creating a community for a community service by selecting at least one of a plurality of community types provided by a community server;
   downloading at least one task according to a role for the created at least one community service from the community server; and
   installing the downloaded task for the community service, wherein the community server provides a list of the plurality of community types to the creator mobile terminal to be selected from, in response to a request for community creation by the creator mobile terminal.

2. The method of claim 1, wherein each of the at least one task comprises a program for a community service related to a specific role of a specific community type.

3. The method of claim 1, further comprising:
   determining at least one member to be invited to the community service; and
   providing information on the determined at least one member to the community server.

4. The method of claim 3, wherein the at least one member to be invited to the community service is determined according to at least one of a phone book and member information of the community server.

5. The method of claim 3, wherein the role is defined for each community member, and a right of the community service is differentiated according to the role.

6. The method of claim 1, wherein the creator mobile terminal of the community has a master right and is capable of deregistering a community member, and, if the creator mobile terminal is deregistered, the master right is endorsed to another member.

7. The method of claim 1, further comprising canceling the community.

8. The method of claim 1, wherein, when the task is deleted, the created community is canceled or a community member is deregistered from the created community.

9. The method of claim 1, further comprising receiving state information on community members from the community server.

10. The method of claim 1, wherein each of the at least one task operates in a specialized mobile community service platform and is compatible with an existing Operating System (OS).

11. A method of operating a server for a mobile community service, the method comprising:
   providing a creator mobile terminal with at least one community type among various community types and determining at least one community member when a community creation is requested by the creator mobile terminal;
   transmitting a community invitation to the at least one community member determined by the creator mobile terminal; and
   providing at least one task according to a role for at least one community service when the community invitation is accepted,
   wherein the at least one community member is not the creator mobile terminal requesting the community creation.

12. The method of claim 11, wherein each of the at least one task comprises a program for a community service related to a specific role of a specific community type.

13. The method of claim 11, further comprising providing state information of the at least one community member to the creator mobile terminal that creates the community.

14. The method of claim 11, wherein each of the at least one task operates in a specialized mobile community service platform and is compatible with an existing Operating System (OS).

15. A method of operating an invitation mobile terminal for a mobile community service, the method comprising:
   receiving a community invitation from a community server for a community for a community service created by a creator mobile terminal by selecting at least one of a plurality of community types provided by the community server that was sent to the creator mobile terminal when community creation was requested by the creator mobile terminal;
   downloading at least one task according to a role for the community service from the community server when the community invitation is accepted; and
   installing the downloaded task for the community service.

16. The method of claim 15, wherein each of the at least one task comprises a program for a community service related to a specific role of a specific community type.

17. The method of claim 15, further comprising transmitting information on a community state of the terminal to the community server.

18. The method of claim 15, further comprising deregistering a community member from the community.

19. The method of claim 15, wherein each of the at least one task operates in a specialized mobile community service platform and is compatible with an existing Operating System (OS).

20. A creator mobile terminal apparatus for a mobile community service, the apparatus comprising:
   a community manager for creating a community for a community service by selecting at least one of a plurality of community types displayed on the creator mobile terminal apparatus as provided by a community server in response to a request for community creation by the creator mobile terminal apparatus;
   a task manager for downloading to the creator mobile terminal apparatus at least one task according to a role for the created at least one community service from the community server; and
   a task executor for installing the downloaded task for the community service,
   wherein the community server provides a list of the plurality of community types to the creator mobile terminal apparatus to be selected from.

21. The apparatus of claim 20, wherein each of the at least one task comprises a program for a community service related to a specific role of a specific community type.

22. The apparatus of claim 20, further comprising a community manager for determining at least one member to be invited to the community service, and for providing information on the determined at least one member to the community server.

23. The apparatus of claim 22, wherein the at least one member to be invited to the community service are determined according to at least one of a phone book and member information of the community server.

24. The apparatus of claim 22, wherein the role is defined for each community member, and a right of the community service is differentiated according to the role.

25. The apparatus of claim 20, wherein the creator mobile terminal apparatus of the community has a master right and is capable of deregistering a community member, and, if the creator mobile terminal apparatus is deregistered, the master right is endorsed to another member.

26. The apparatus of claim 20, wherein the community manager cancels the community.

27. The apparatus of claim 20, wherein, when the task is deleted, the created community is canceled or a community member is deregistered from the created community.

28. The apparatus of claim 20, wherein the community manager receives information on community members from the community server.

29. The apparatus of claim 20, wherein each of the at least one task operates in a specialized mobile community service platform and is compatible with an existing Operating System (OS).

30. A server apparatus for a mobile community service, the apparatus comprising a controller for providing a creator mobile terminal with at least one community type among various community types and determining at least one community member, when a community creation is requested by the creator mobile terminal, for transmitting a community invitation from the server apparatus to the at least one community member determined by the creator mobile terminal, and for providing a task according to a role for at least one community service when the community invitation is accepted, wherein the at least one community member is not the creator mobile terminal requesting the community creation.

31. The apparatus of claim 30, wherein each of the at least one task comprises a program for a community service related to a specific role of a specific community type.

32. The apparatus of claim 30, wherein the controller provides state information of the at least one community member to the creator mobile terminal that creates the community.

33. The apparatus of claim 30, wherein each of the at least one task operates in a specialized mobile community service platform and is compatible with an existing Operating System (OS).

34. An invitation mobile terminal apparatus for a mobile community service, the apparatus comprising:
- a community manager for receiving, by the invitation mobile terminal apparatus, a community invitation from a community server for a community for a community service created by a creator mobile terminal by selecting at least one of a plurality of community types provided by the community server that was sent to the creator mobile terminal when community creation was requested by the creator mobile terminal;
- a task manager for downloading, by the invitation mobile terminal apparatus, at least one task according to a role for the community service from the community server when the community invitation is accepted; and
- a task executor for installing on the invitation mobile terminal apparatus the downloaded task for the community service.

35. The apparatus of claim 34, wherein each of the at least one task comprises a program for a community service related to a specific role of a specific community type.

36. The apparatus of claim 34, further comprising a community executor for transmitting information on a community state of the terminal to the community server.

37. The apparatus of claim 34, wherein the community manager deregisters a community member.

38. The apparatus of claim 34, wherein each of the at least one task operates in a specialized mobile community service platform and is compatible with an existing Operating System (OS).

39. A system for a mobile community service, the system comprising:
- a creator mobile terminal for creating a community for a community service by selecting at least one of a plurality of community types provided by a community server, for downloading a first task according to a role for the created at least one community service from the community server, and for installing the downloaded first task;
- the community server for determining at least one community member when a community creation is requested by the creator mobile terminal, for transmitting a community invitation to the at least one community member determined by the creator mobile terminal, and for providing a second task according to the role for the at least one community service to an invitation mobile terminal; and
- a plurality of invitation mobile terminals for receiving the community invitation from the community server, and for downloading and installing, by one or more invitation accept terminals, the second task according to the role for the community service,
- wherein the community server provides a list of the plurality of community types to the creator mobile terminal to be selected from, in response to the request for community creation by the creator mobile terminal.

40. The system of claim 39, wherein each of the first and second task comprises a program for a community service related to a specific role of a specific community type.

41. The system of claim 39, wherein the creator mobile terminal determines one or more members to be invited to the community service, and provides state information on the determined one or more members of the community service to the community server.

42. The system of claim 41, wherein the one or more members to be invited to the community service are determined according to at least one of a phone book and member information of the community server.

43. The system of claim 41, wherein the role is defined for each community member, and a right of the community service is differentiated according to the role.

44. The system of claim 39, wherein the creator mobile terminal has a master right and is capable of deregistering a community member, and, if the creator mobile terminal is deregistered from the community, the master right is endorsed to another member.

45. The system of claim 39, wherein the creator mobile terminal receives information on community members from the community server.

46. The system of claim 39, wherein each of the first and second task operates in a specialized mobile community service platform and is compatible with an existing Operating System (OS).

47. A non-transitory computer-readable recording medium having recorded thereon a program for a mobile community service, the non-transitory computer-readable recording medium comprising:
- a first code segment, for creating a community for a community service by selecting at least one of a plurality of community types provided by a community server;
- a second code segment, for downloading at least one task according to a role for the created at least one community service from the community server; and
- a third code segment, for installing the downloaded task for the community service,
- wherein the community server provides a list of the plurality of community types to the creator mobile terminal to be selected from, in response to a request for community creation by the creator mobile terminal.

48. A non-transitory computer-readable recording medium having recorded thereon a program for a mobile community service, the non-transitory computer-readable recording medium comprising:
- a first code segment, for providing a creator mobile terminal with at least one community type among various community types and determining at least one community member, when a community creation is requested by the creator mobile terminal;
- a second code segment, for transmitting a community invitation to the at least one community member determined by the creator mobile terminal; and
- a third code segment, for providing at least one task according to a role for at least one community service when the community invitation is accepted,
- wherein the at least one community member is not the creator mobile terminal requesting the community creation.

49. A non-transitory computer-readable recording medium having recorded thereon a program for a mobile community service, the non-transitory computer-readable recording medium comprising:
- a first code segment, for receiving a community invitation from a community server for a community for a community service created by a creator mobile terminal by selecting at least one of a plurality of community types provided by the community server that was sent to the creator mobile terminal when community creation was requested by the creator mobile terminal;
- a second code segment, for downloading at least one task according to a role for the community service from the community server when the community invitation is accepted; and
- a third code segment, for installing the downloaded task for the community service.

* * * * *